(12) United States Patent
Schlautman et al.

(10) Patent No.: US 9,069,071 B1
(45) Date of Patent: Jun. 30, 2015

(54) GNSS NAVIGATION FOR A MECHANIZED IRRIGATION CORNER SYSTEM

(71) Applicants: Neal J. Schlautman, Saronville, NE (US); Brent A. Pohlmann, Hastings, NE (US); David A. Nelson, Hastings, NE (US); Kent E. Schueler, Clay Center, NE (US); Phill J. Tiemeyer, Fairfield, NE (US)

(72) Inventors: Neal J. Schlautman, Saronville, NE (US); Brent A. Pohlmann, Hastings, NE (US); David A. Nelson, Hastings, NE (US); Kent E. Schueler, Clay Center, NE (US); Phill J. Tiemeyer, Fairfield, NE (US)

(73) Assignee: T-L IRRIGATION CO., Hastings, NE (US)

( * ) Notice: Subject to any disclaimer, the term of this patent is extended or adjusted under 35 U.S.C. 154(b) by 97 days.

(21) Appl. No.: 13/895,465

(22) Filed: May 16, 2013

(51) Int. Cl.
*G01S 19/40* (2010.01)
*A01G 25/09* (2006.01)
*A01B 69/00* (2006.01)

(52) U.S. Cl.
CPC .............. *G01S 19/40* (2013.01); *A01G 25/092* (2013.01); *A01B 69/00* (2013.01)

(58) Field of Classification Search
CPC .... A01B 69/00; A01B 69/001; A01B 69/002; A01B 69/003; A01B 69/004; A01B 69/005; A01B 69/006; A01B 69/007; A01B 69/008; A01G 25/09; A01G 25/092; G01S 19/38; G01S 19/39; G01S 19/40; G01S 19/41
USPC ............................ 701/50, 469, 470; 700/284
See application file for complete search history.

(56) References Cited

U.S. PATENT DOCUMENTS

| | | | |
|---|---|---|---|
| 3,797,517 A * | 3/1974 | Kircher et al. | ................ 239/738 |
| 3,902,668 A | 9/1975 | Daugherty et al. | |
| 6,095,439 A | 8/2000 | Segal et al. | |
| 6,290,151 B1 * | 9/2001 | Barker et al. | ................ 239/729 |
| 6,726,132 B2 | 4/2004 | Malsam | |
| 6,923,390 B1 | 8/2005 | Barker | |
| 6,928,339 B2 | 8/2005 | Barker | |
| 7,584,053 B2 | 9/2009 | Abts | |
| 7,885,745 B2 | 2/2011 | McClure et al. | |
| 8,185,303 B1 | 5/2012 | Wieting | |
| 8,401,704 B2 | 3/2013 | Pollock et al. | |
| 2010/0274398 A1 | 10/2010 | Choat | |
| 2011/0153161 A1 | 6/2011 | Grabow et al. | |
| 2012/0010782 A1 | 1/2012 | Grabow | |

* cited by examiner

*Primary Examiner* — Jerrah Edwards
(74) *Attorney, Agent, or Firm* — Dennis L. Thomte; Thomte Patent Law Office LLC

(57) ABSTRACT

A GNSS based steering control system for a mechanized irrigation corner arm utilizing waypoint navigation.

2 Claims, 12 Drawing Sheets

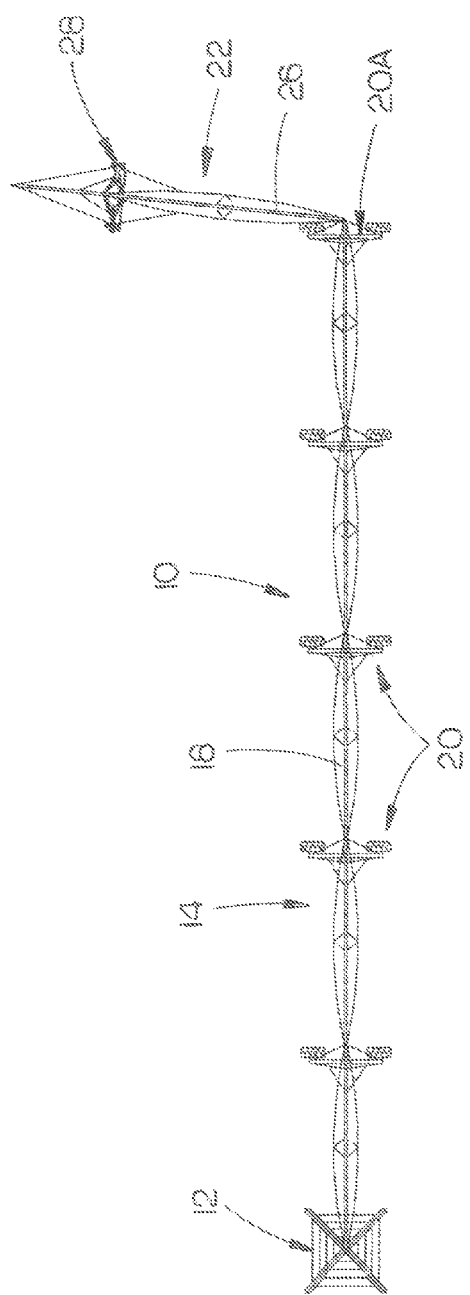
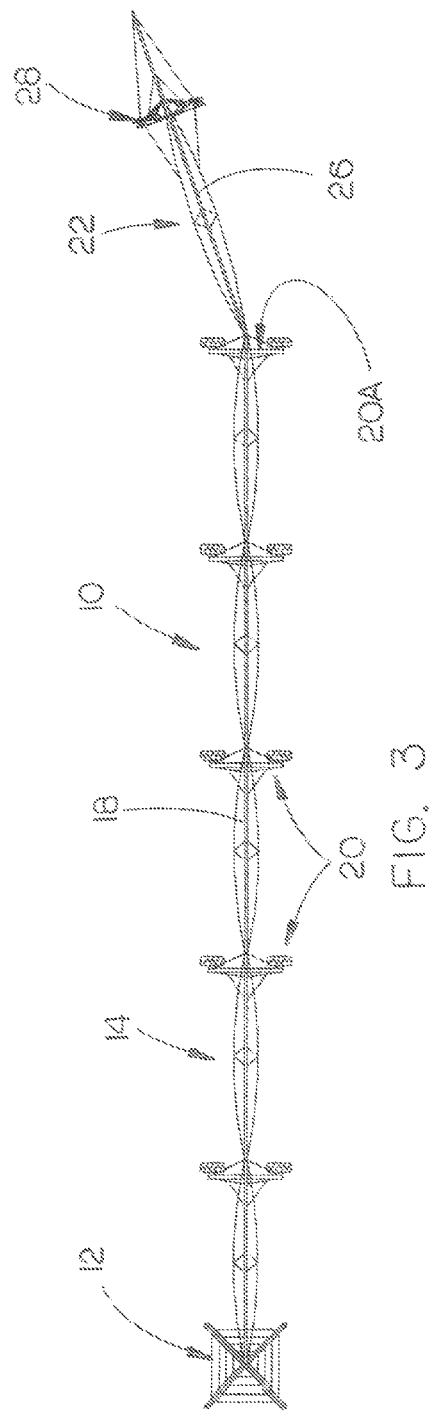

GNSS NAVIGATION FOR A MECHANIZED IRRIGATION CORNER SYSTEM

BACKGROUND OF THE INVENTION

1. Field of the Invention

This invention relates to mechanized center-pivot irrigation systems, having a corner system attached thereto to provide water to the corners of a field. More specifically, this invention relates to a system for path following using global navigation satellite system (GNSS) control for waypoint navigation of the corner system.

2. Description of the Related Art

Mechanized center-pivot irrigation systems have been used to apply water to large sections of land in an efficient manner to greatly improve crop production. To overcome the limitation of irrigating only a circular pattern, a corner system can be added to the end of a center pivot to irrigate additional areas of a square, rectangular or irregular-shaped field.

Corner systems were first introduced in the 1970s and utilized a guidance system for guiding or steering the corner system along a path. The most popular method for guiding a corner system has been through the use of a buried wire which emits an electromagnetic field that can be detected by sensors on the corner system. See U.S. Pat. No. 3,902,668, Daugherty, et al. Drawbacks to this system include obstacles to burying the typical 9500 feet of wire for instance where rocks are present, difficulty in repairing damage to the buried cable and difficulty in changing the path to be followed.

Global navigation satellite systems (GNSS) have recently been used for corner system guidance, utilizing GPS satellites. U.S. Pat. No. 6,095,439, Segal, et al. disclosed a method for determining optimum steer angle based on the error between a computed pivot-SDU distance and an ideal pivot-SDU distance. U.S. Pat. No. 6,290,151 B1, Barker, et al. also disclosed a method of steering the corner based on the error between the actual rover distance from the pivot point versus an intended distance from the pivot point and additionally a method of projecting a virtual position at a selected length of travel to determine steering. U.S. Pat. No. 6,923,390 B1 Barker, et al. disclosed a method of using two antennas that rotate with steering movement, with the antenna leading in the direction of travel used to determine the distance from a point midway between two selected points on the path of travel. U.S. Pat. No. 8,401,704 B2 Pollock, et al. disclosed a method of using two GNSS antennas to compute a vector orientation to control the corner system, with one antenna located at the hinged connection of the pivot to the corner system (last regular drive unit) and one antenna located on the corner system boom.

In US Patent Application Publication No. 2011/0153161 A1 published Jun. 23, 2011, applicants John Grabow, et al describe a corner guidance control system using two antennas attached by a rail system at a right angle to a corner system wheel, with the two antennas used to calculate current position of the wheel for steering purposes and to calculate a tilt angle from the altitude of the two antennas.

In US Patent Publication No. 2012/0010782 A1 published Jan. 12, 2012) applicant John Grabow describes a corner guidance control system using one antenna that is located along a vertical axis through a center of a wheel of the corner unit to acquire current position of the center of the wheel and a wheel angle sensor used to determine the current heading of the wheel. A point is calculated along the corner travel path that is a radial distance from the current position and a future heading is determined to steer the wheel versus the current heading.

The present invention provides an improved system for corner path following that employs global navigation satellite system (GLASS) sensors which utilizes waypoint navigation.

SUMMARY OF THE INVENTION

This Summary is provided to introduce a selection of concepts in a simplified form that are further described below in the Detailed description. This Summary is not intended to identify key aspects or essential aspects of the claimed subject matter. Moreover, this Summary is not intended for use as an aid in determining the scope of the claimed subject matter.

This invention relates to a mechanized corner irrigation system, which is part of a center pivot irrigation system, for irrigating a field having navigation waypoints which correspond to the correct position of the steerable drive unit of the corner irrigation system as the center pivot irrigation system and the corner irrigation system move around the field. The center pivot irrigation system includes a center pivot structure, a main arm extending outwardly from the center pivot structure with the main arm being supported upon and driven in either a forwardly or rearwardly direction around the field by a plurality of non-steerable drive units. The corner irrigation system includes an elongated corner arm pivotally secured to the outer end of the main arm of the center pivot irrigation system and which is supported upon and driven by a steerable drive unit.

The steerable drive unit includes a horizontally disposed main beam, having first and second ends, which are positioned below the corner arm and which is disposed transversely with respect to the corner arm. A first drive wheel support is positioned at the first end of the main beam and is rotatable with respect thereto about a vertical axis. A second drive wheel support is positioned at the second end of the main beam and is rotatable with respect thereto about a vertical axis. The first and second drive wheels are mounted on the first and second drive wheel supports respectively. The steerable drive unit also includes first and second horizontally disposed crank arms which have inner and outer ends. The inner end of the first crank arm is affixed to the first drive wheel support and extends therefrom. The inner end of the second crank arm is affixed to the second drive wheel support and extends therefrom. An elongated connecting rod has one end thereof pivotally secured to the outer end of the first crank arm and has its other end pivotally secured to the outer end of the second crank arm. The steerable drive unit also includes a steering actuator which is mounted thereon and which is operatively connected to one of the first and second crank arms for pivotally moving the first and second drive wheel supports and the drive wheels thereon in a right direction or a left direction to steer the steerable drive unit as the corner irrigation system is moved around the field.

A rover navigation box is positioned on the steerable drive unit and includes a GNSS receiver mounted on a printed circuit board. A rover GNSS antenna is mounted on the steerable drive unit which is in communication with the GNSS receiver in the rover navigation box. The navigation waypoints are loaded and stored in the printed circuit board of the rover navigation box. The rover navigation box is operatively connected to the steering actuator to control the operation of the steering actuator.

A base navigation box is positioned on the center pivot irrigation system at the center pivot structure. The base navigation box includes a GNSS receiver mounted on a printed circuit board. A base GNSS antenna is mounted on the center pivot irrigation system at the center pivot structure with the base GNSS antenna being in communication with the GNSS receiver in the base navigation box. The base navigation box is configured to compute its position using RTK to send corrections to the rover navigation box with the rover navigation box continuously computing its corrected position as the steerable drive unit moves around the field with the corrected position of the steerable drive unit being compared to the two closest navigation waypoints to determine the steering direction of the steering actuator and the amount of steering time to ensure that the steerable drive unit stays on its intended path.

It is therefore a principal object of the invention to provide a GNSS path following system for mechanized irrigation corner systems utilizing waypoint navigation.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 2 is a plan view illustrating the corner irrigation system in a retracted position;

FIG. 3 is a view similar to FIG. 2 except that the corner system has been moved to an extended position;

DESCRIPTION OF THE PREFERRED EMBODIMENT

Figure 1:
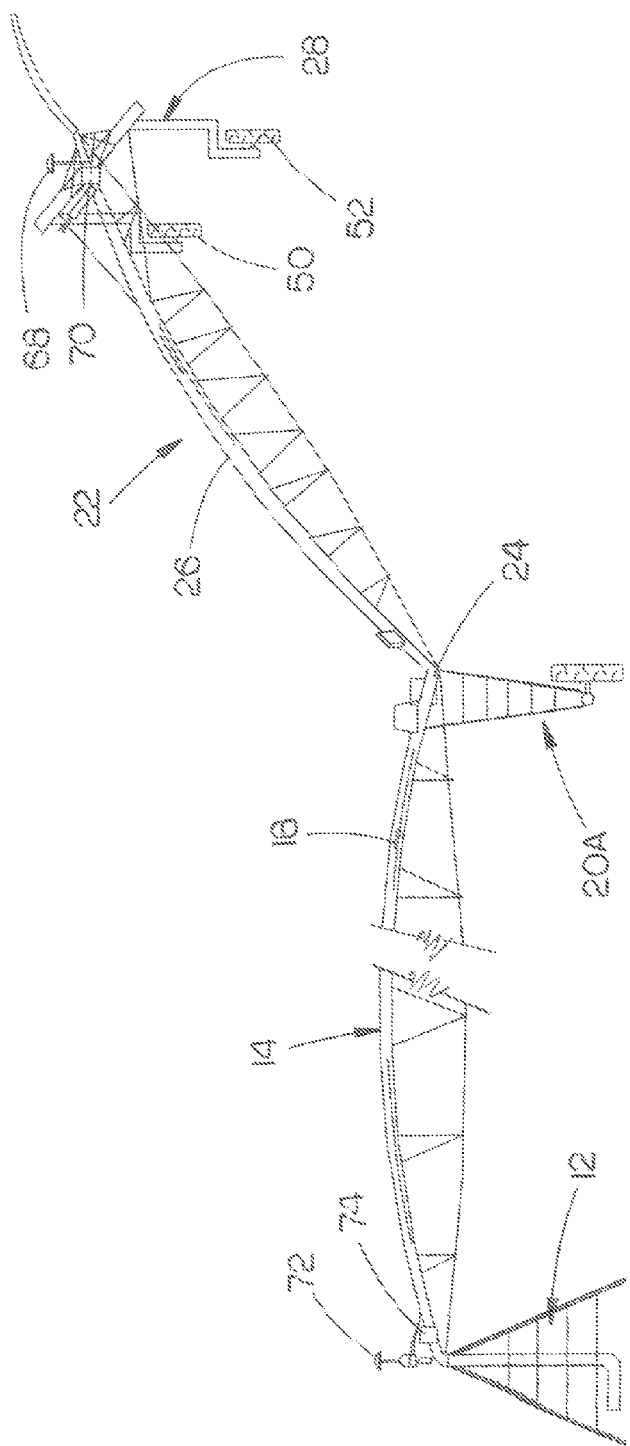
FIG. 1 is a partial perspective view of a mechanized irrigation corner system having the GNSS navigation system of this invention associated therewith.
Figure 4:
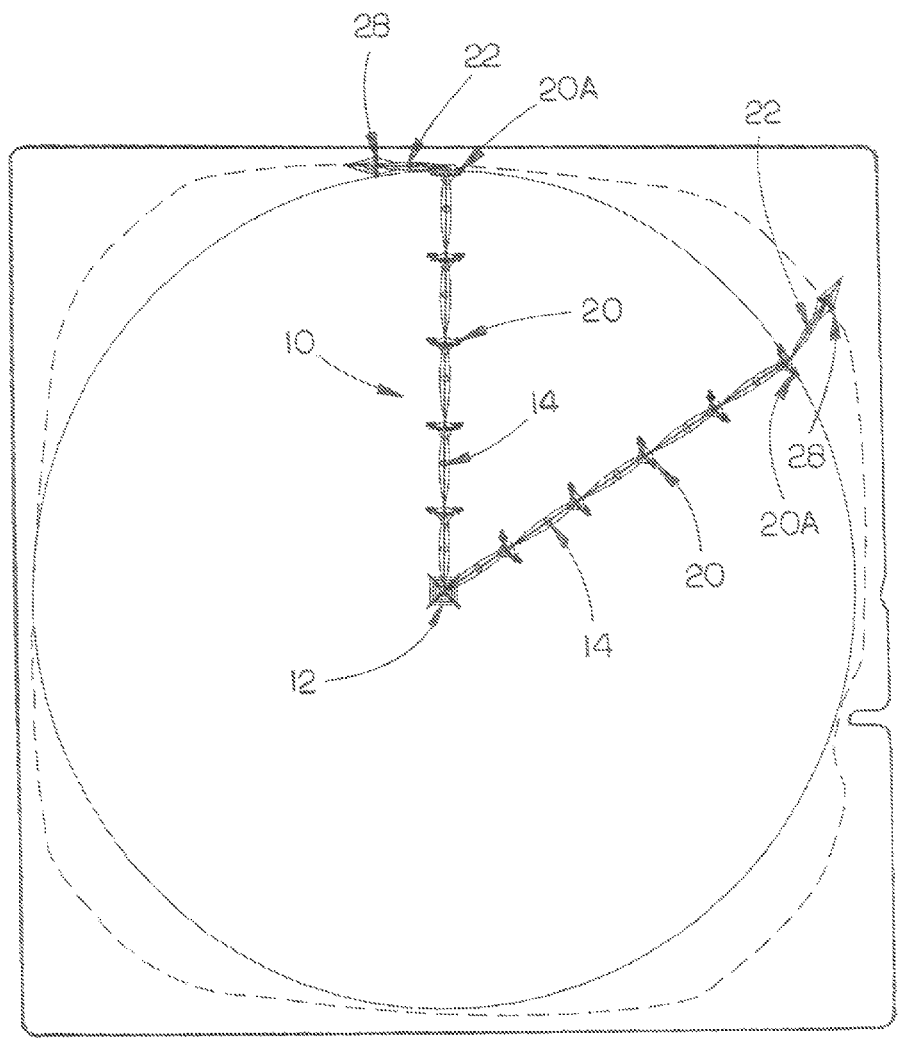
FIG. 4 is a schematic view illustrating the manner in which the corner system is moved from the retracted position to an extended position to water the corners of a field and is retracted to avoid an obstruction.
Figure 5:
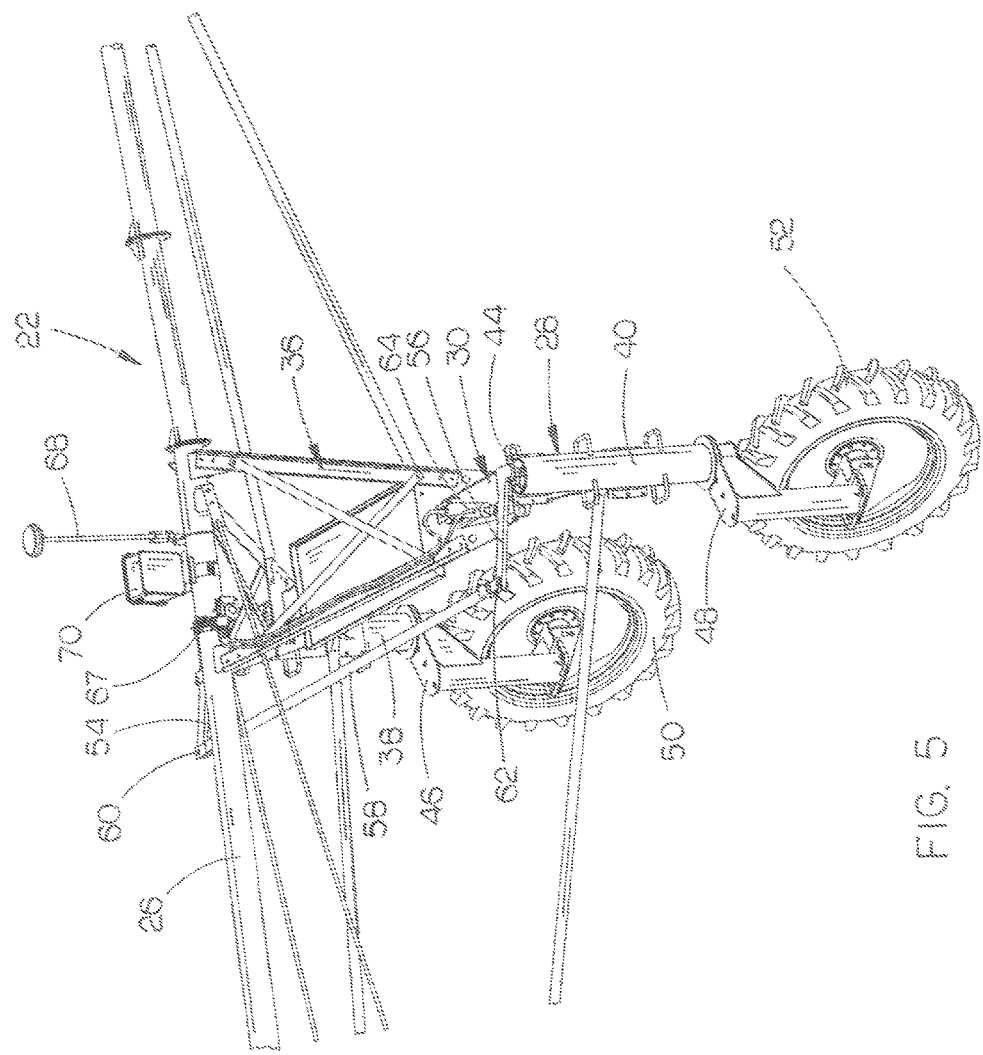
FIG. 5 is a partial perspective view of the steerable drive unit (SDU) of the corner system which illustrates the hydraulic steering cylinder in a retracted position.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to a mechanized irrigation system which is commonly referred to as a corner pivot irrigation system. System 10 includes a center pivot structure 12 having a main arm 14 extending outwardly from the pivot structure 12. The main arm 14 comprises a water conduit or pipeline 18 supported upon a plurality of non-steerable drive units or towers 20. Corner arm 22 is pivotally connected to the last regular drive unit (LRDU) 20A at 24 in conventional fashion and comprises a water conduit or pipe 26 which is supported upon a steerable drive unit (SDU) or tower 28.

SDU 28 includes a main beam 30 having opposite ends 32 and 34. Beam 30 may be disposed at a right angle to the longitudinal axis of pipe 26 or at some other angle with respect thereto as is common in most corner pivot irrigation machines or systems. Beam 30 is secured to pipe 26 by a truss 36. A pair of tubular supports 38 and 40 are secured to ends 32 and 34 of beam 30 respectively and extend downwardly therefrom. The lower ends of supports 38 and 40 receive vertically disposed tubes 42 and 44 respectively of drive wheel supports 46 and 48 respectively. Drive wheels 50 and 52 are rotatably mounted on the lower ends of drive wheel supports 46 and 48 respectively. Drive wheels 50 and 52 may be driven by hydraulic motors or electric motors in conventional fashion.

One end of a crank arm 54 is fixed to the upper end of tube 42 and extends horizontally therefrom. One end of a crank arm 56 is fixed to the upper end of tube 44 and extends horizontally therefrom. An elongated tie rod or link 58 has one end pivotally connected to the outer end of crank arm 54 at 60 and has its other end pivotally connected to the outer end of crank arm 56 at 62.

Figure 6:
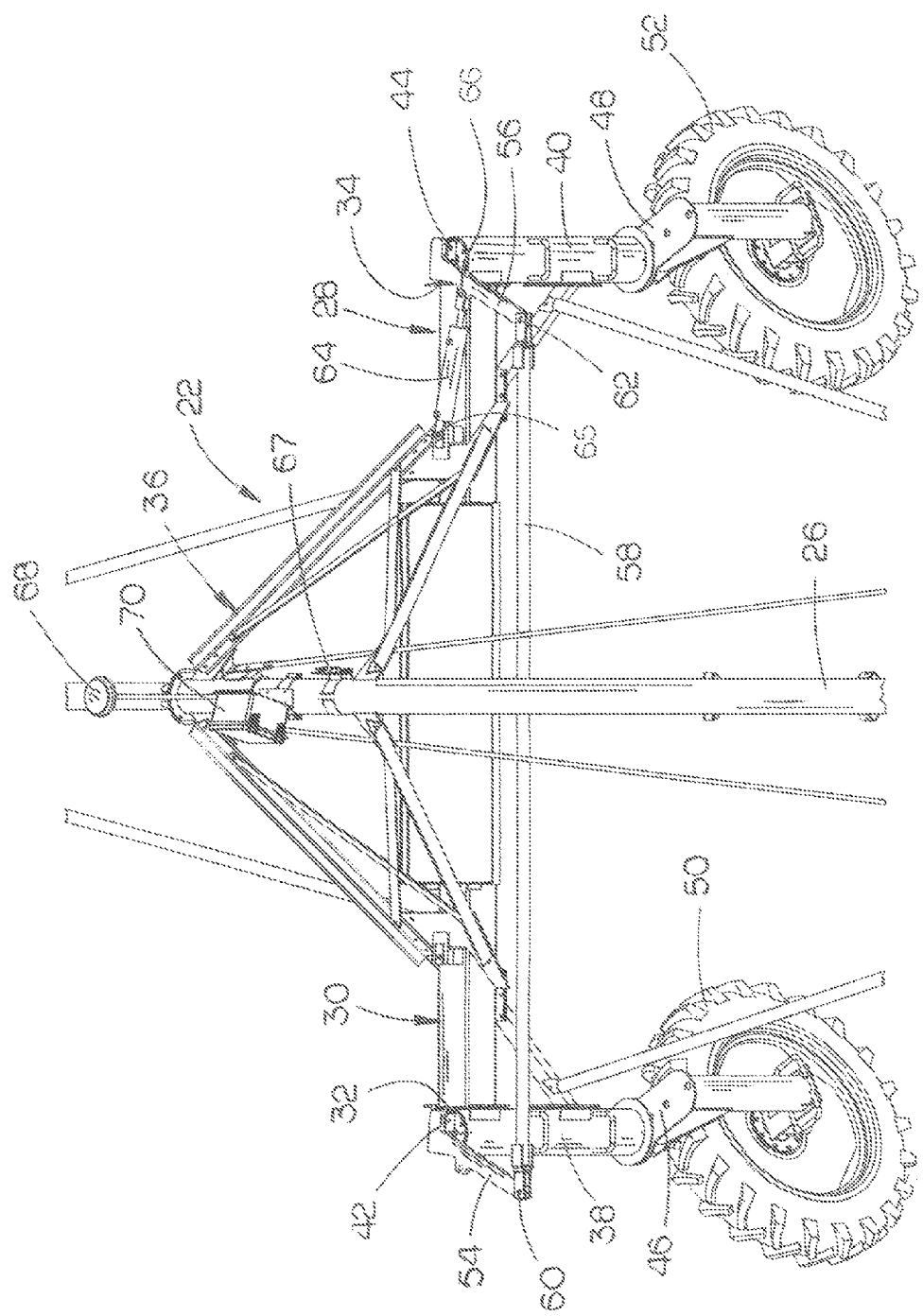
FIG. 6 is a further partial perspective view of the SDU of the corner system which illustrates the hydraulic steering cylinder in a retracted position.
Figure 7:
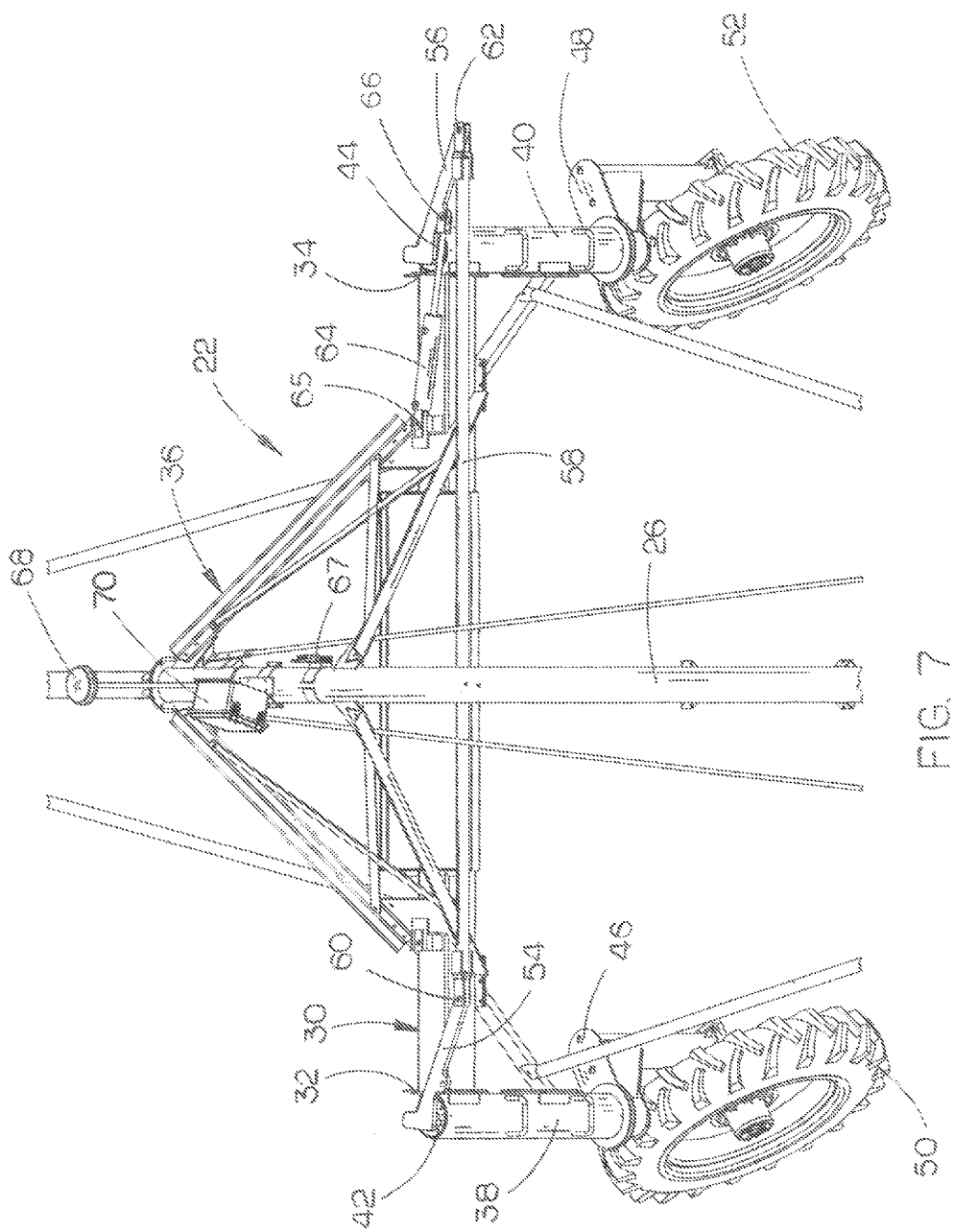
FIG. 7 is another partial perspective view of the SDU of the corner system which illustrates the hydraulic steering cylinder in a fully extended position.

In the embodiment shown in the drawings, a hydraulic steering cylinder 64 has its base end pivotally operatively connected to beam 30 at 65 and has its rod end pivotally connected to crank arm 56 at 66. The hydraulic cylinder 64 is employed when the drive wheels of the system are driven hydrostatically such as those systems manufactured by the assignee of this invention. If the drive wheels of this system are electrically driven, an electric motor and gearbox structure will replace the hydraulic steering cylinder 64. In this system, extension of the cylinder rod of hydraulic cylinder 64 will cause tubes 42 and 44 and the drive wheels 50 and 52 to be rotated in a first (right) direction (FIG. 7). The retracting of the cylinder rod of hydraulic cylinder 64 will cause tubes 42 and 44 and the drive wheels 50 and 52 to be rotated in a second (left) direction opposite to the first (right) direction (FIG. 6).

The numeral 67 refers to a hydraulic steering solenoid valve which is fluidly connected to a source of hydraulic fluid under pressure. Valve 67 includes two coils, with one energized to "steer right" and the other energized to "steer left." To steer right, the steering cylinder 64 extends. To steer left, the steering cylinder 64 retracts. The tie rod 58 allows wheels 50 and 52 to steer at the same time. Valve 67 is fluidly connected to hydraulic steering cylinder 64. The numeral 68 refers to a GNSS antenna which extends upwardly from pipe 26 above main beam 30, as seen in the drawings. The numeral 70 refers to a rover navigation box mounted on pipe 26. The numeral 72 refers to a GNSS antenna which is mounted on the center pivot structure 12. A base navigation box 74 is mounted on the inner end of main arm 14.

Figure 13:
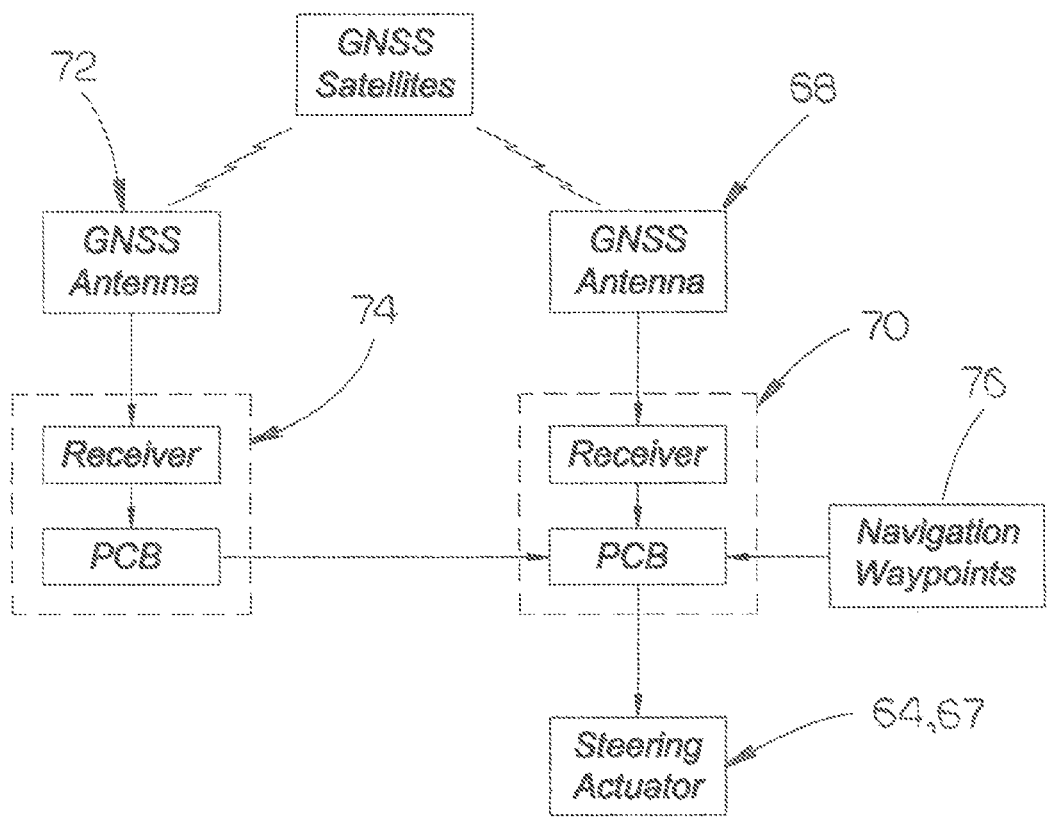
FIG. 13 is a block schematic of the circuits of this invention.

The GNSS antenna 68 is connected to a GNSS receiver located inside the rover navigation box 70 (FIG. 13). The GNSS receiver is mounted on a printed circuit board (PCB) inside the rover navigation box 70 (FIG. 13) and the PCB has the means to store the navigation waypoints 76 as will be described hereinafter. The GNSS antennas 68 and 72 and the receivers associated therewith have the capability of receiving GPS and Glonass satellite signals and can be expanded to other constellations as they become available.

Figure 8:
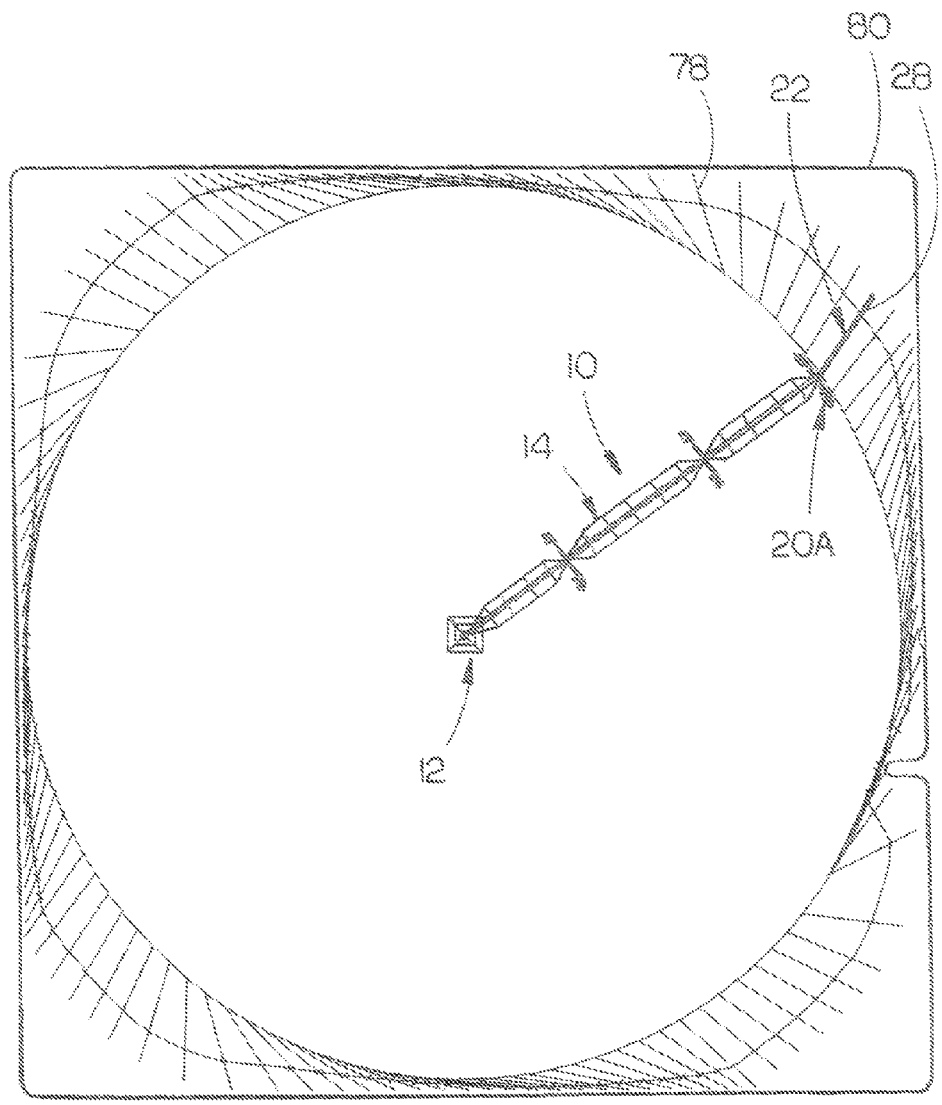
FIG. 8 is a plan schematic view which illustrates the method of generating the navigation way points using a CAD program to draw a corner system array.
Figure 9:
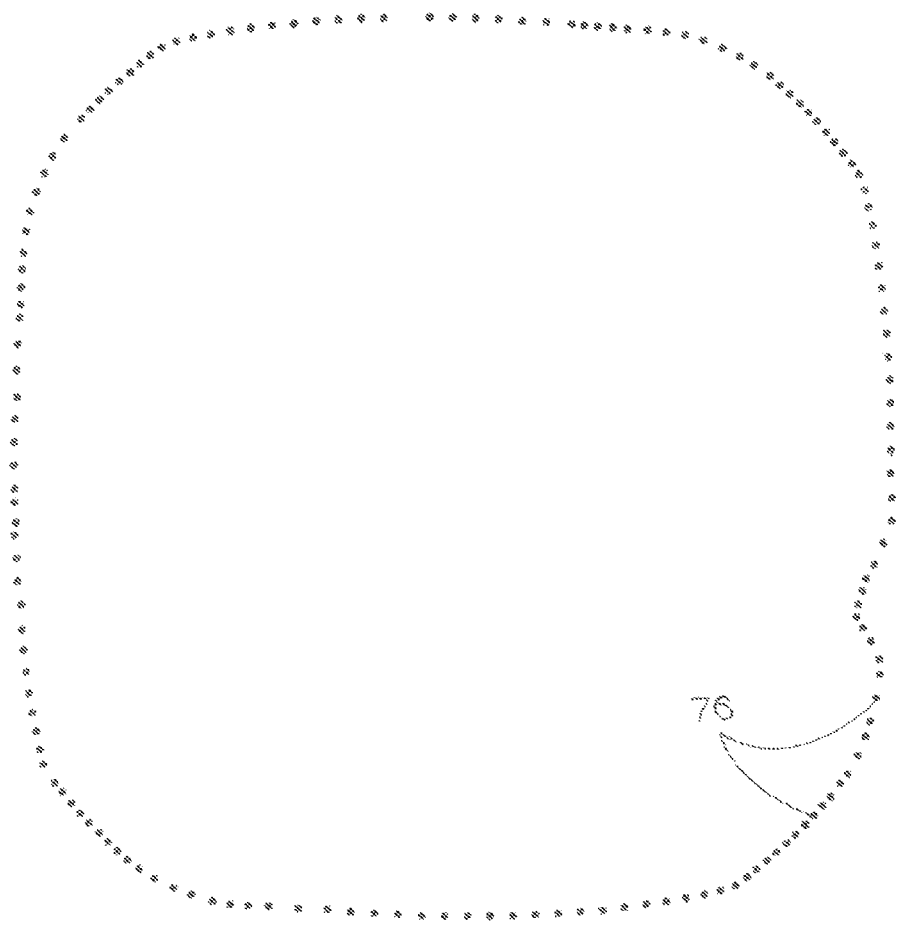
FIG. 9 is a plan view which illustrates the navigation waypoints generated from the corner array to be used for path following by the navigation system of this invention.

FIG. 8 illustrates the method of generating the navigation waypoints 76 of FIG. 9 using a CAD program to draw a corner system array 78. The corner system array 78 represents the location of the corner system 22 and the SDU 28 at numerous different points in the field 80. The SDU locations are then used to generate specific latitude and longitudinal waypoints 76 as seen in FIG. 9 that will be stored as a file and transferred to the rover navigation box 70. The method of generating the navigation waypoints could also be through a simulation program or mapping program.

FIG. 9 illustrates the navigation waypoints 76 generated from the corner system array 78 to be used for path following by the navigation system. The series of waypoints is exported to a file that is transferred to the PCB in the rover navigation box 70 as stated above.

Figure 10:
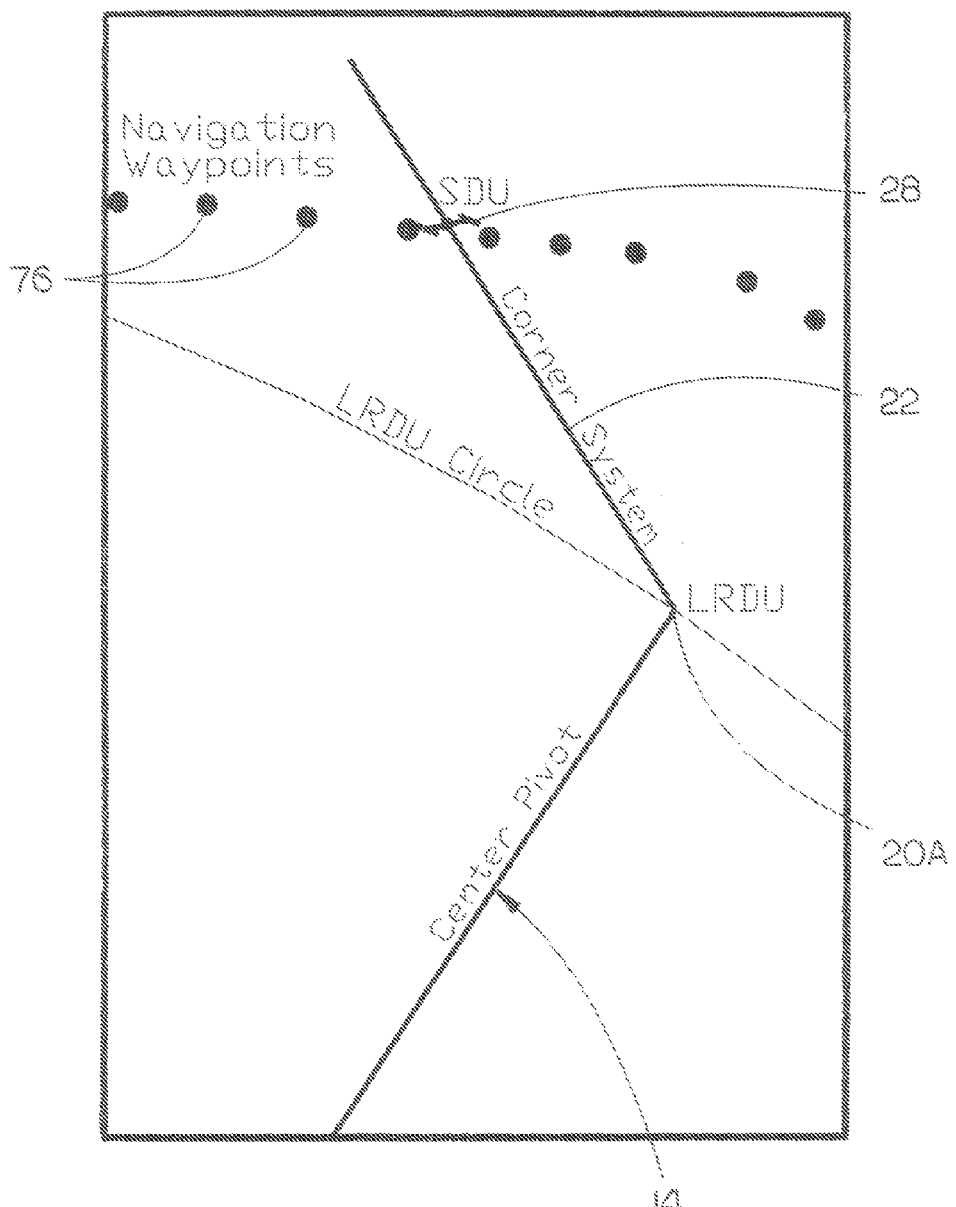
FIG. 10 is a plan generalized schematic view of the SDU and the nearby navigation waypoints.
Figure 11:
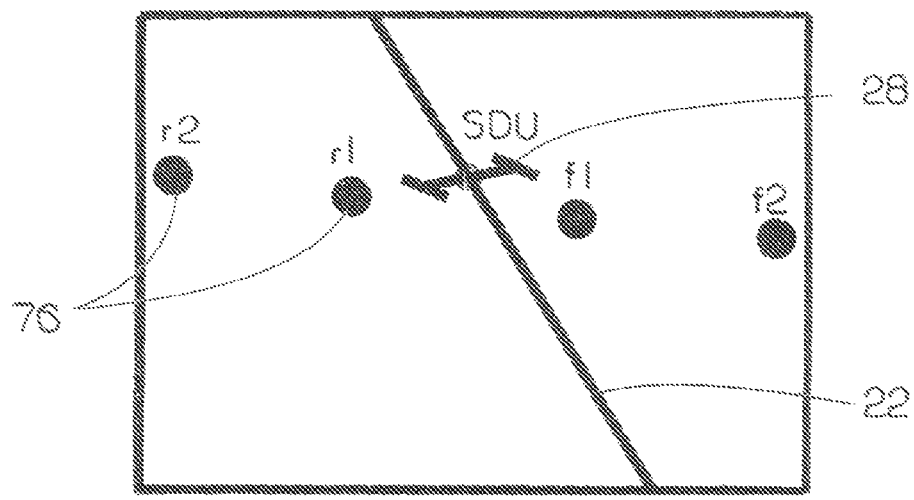
FIG. 11 is a plan generalized schematic view which illustrates the relationship of the SDU with respect to spaced-apart waypoints.

FIGS. 10 and 11 illustrate a generalized top view of the SDU 28 and the nearby navigation waypoints (r2, r1, f1, f2) as contained in a file loaded onto the PCB in the rover navigation box 70. Each waypoint has a specific x, y coordinate or latitude, longitude associated with it. The steerable drive unit (SDU) 28 also has a certain x, y (latitude, longitude) associated with it, as determined by the GNSS system. As shown in the example of FIG. 11, if the system is moving in Reverse, then the SDU 28 will be navigating from waypoint "f1" to waypoint "r1". If system moving in Forward, then the SDU 28 will be navigating from way point "r1" to waypoint "f1."

To summarize somewhat, the SDU position (latitude, longitude) is determined to centimeter accuracy through an RTK technique of the GNSS system. With RTK, the base navigation box 74 computes its position and sends corrections to the rover navigation box 70 via a communication cable or wireless radio. The rover navigation box 70 then continuously computes its corrected position as the SDU 28 moves. This corrected SDU position is then compared to the two closest navigation waypoints, one on either side of the SDU 28, and through a steering formula based on two parameters of cross-track error and heading error, the steering direction and the amount of steering time is determined. The steering solenoid valve 67 directs oil to the hydraulic steering cylinder 64 to steer the SDU 28 and is energized to steer in the correct direction and for the amount of steering time to ensure the SDU 28 stays on the intended path. Steering systems could consist of an electric motor and gear box arrangement rather than the hydraulic steering cylinder 64. After steering, the corner system 22 is allowed to move for a specified period of time and then the formula is computed again to determine steering. This loop occurs continuously as the corner system navigates through the waypoints around the field.

Figure 12:
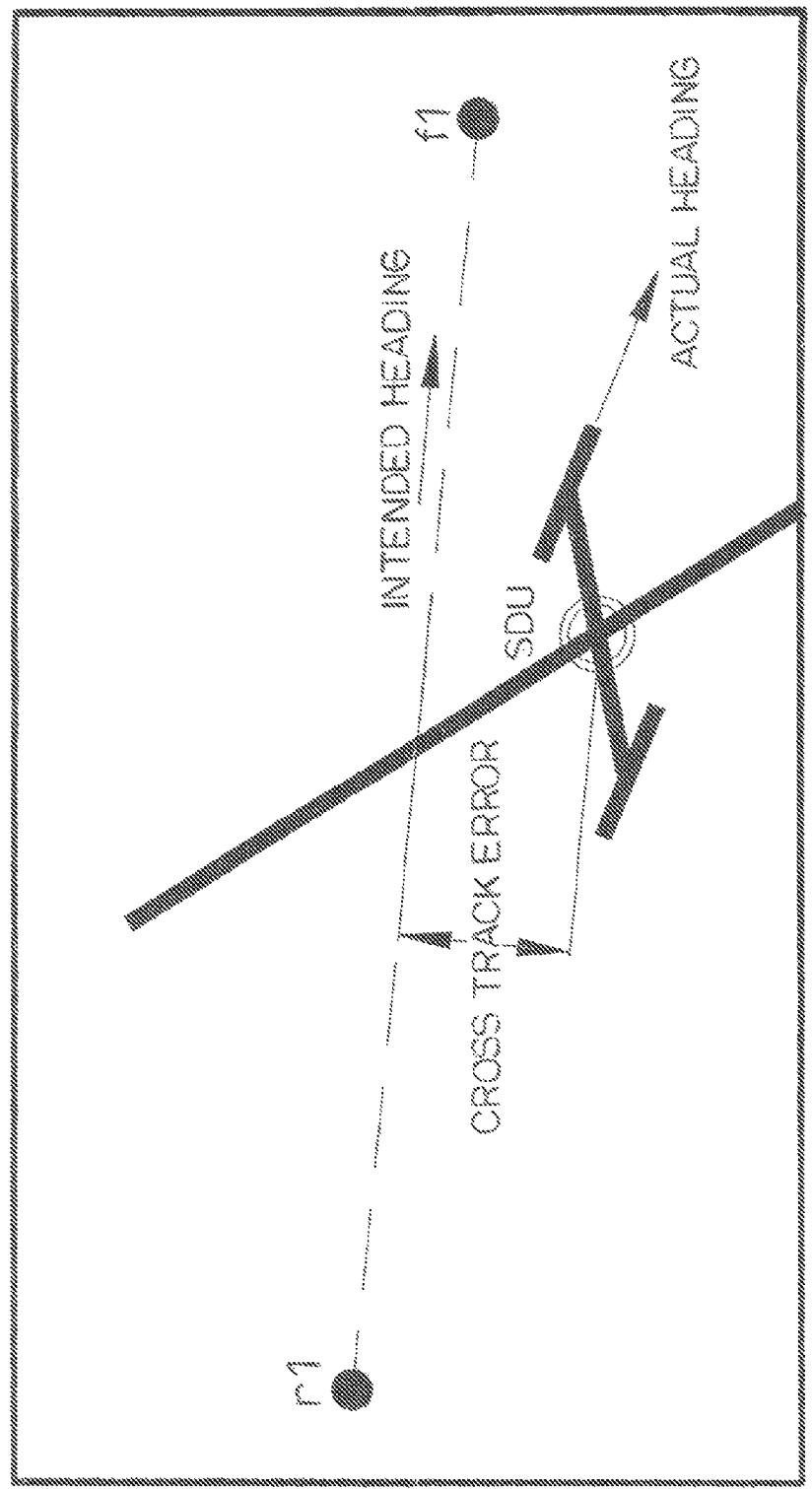
FIG. 12 is a plan generalized schematic view which illustrates the relationship of the SDU to spaced-apart waypoints.

FIG. 12 illustrates an example of two parameters used in the steering formula. Cross-track error is calculated as the distance the SDU 28 is from the intended path. Heading error is calculated by finding the difference between the intended heading angle and the actual heading angle in degrees.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

We claim:

1. The method of irrigating a field, comprising the steps of:
providing a mechanized center pivot irrigation system including a center pivot structure having a main arm, with inner and outer ends, extending outwardly from said center pivot structure which is supported upon and driven in either a forwardly or rearwardly direction around the center pivot structure by a plurality of non-steerable drive units;
providing a corner irrigation system including an elongated corner arm pivotally secured to said outer end of the main arm which is supported upon a steerable drive unit having first and second drive wheels;
creating latitude and longitudinal path navigation waypoints which correspond to the correct latitude and longitudinal position of the steerable drive unit as the main arm and the corner arm move over the field;
mounting a rover GNSS antenna on the steerable drive unit;
mounting a rover navigation box on the steerable drive unit with the rover navigation box having a GNSS receiver, which is in communication with the rover GNSS antenna, and a printed circuit board;
loading and storing the navigation latitude and longitudinal path waypoints in the printed circuit board of the rover navigation box;
operatively coupling the rover navigation box to first and second drive wheels of the steerable drive units for steering the first and second drive wheels of the steerable drive unit;
mounting a base GNSS antenna on the center pivot irrigation system at the center pivot structure;
mounting a base navigation box on the center pivot irrigation system at the center pivot structure with the base navigation box having a GNSS receiver, which is in communication with the base GNSS antenna, and a printed circuit board;
computing the latitude and longitudinal position of the base navigation box utilizing RTK and sending latitude and longitudinal position corrections to the rover navigation box so that the rover navigation box is able to compute its corrected latitude and longitudinal position as the steerable drive unit moves around the field whereby the corrected latitude and longitudinal position of the steerable drive unit is compared to the two closest navigation latitude and longitudinal path waypoints to determine the steering direction of the first and second drive wheels and the amount of steering time to ensure that the steerable drive unit stays on its intended path.

2. In combination:
a mechanized corner irrigation system, having inner and outer ends, including a center pivot structure, a main arm, having inner and outer ends, extending outwardly from said center pivot structure which is supported upon and driven in either a forwardly or rearwardly direction around a field by a plurality of non-steerable drive units, an elongated corner arm pivotally secured to said outer arm end of said main arm which is supported upon and driven by a steerable drive unit, with the field having latitude and longitudinal path waypoints which correspond to the correct position of the steerable drive unit as it moves around the field;

said steerable drive unit comprising:
- (a) a horizontally disposed main beam, having first and second ends, positioned below said corner arm and being disposed transversely with respect to said corner arm;
- (b) a first drive wheel support positioned at said first end of said main beam and being rotatable with respect thereto about a vertical axis;
- (c) a second drive wheel support positioned at said second end of said main beam and being rotatable with respect thereto about a vertical axis;
- (d) a first drive wheel mounted on said first drive wheel support;
- (e) a second drive wheel mounted on said second drive wheel support;
- (f) a first horizontally disposed crank arm having inner and outer ends;
- (g) said inner end of said first crank arm being fixed to said first drive wheel support;
- (h) a second horizontally disposed crank arm having inner and outer ends;
- (i) said inner end of said second crank arm being fixed to said second drive wheel support;
- (j) an elongated connecting rod having first and second ends;
- (k) said first end of said connecting rod being pivotally secured to said outer end of said first crank arm;
- (l) said second end of said connecting rod being pivotally secured to said outer end of said second crank arm;
- (m) a steering actuator mounted on said main beam which is operatively connected to one of said first and second crank arms for pivotally moving said first and second drive wheel supports and said drive wheels thereon between first and second positions to steer said steerable drive unit as said corner irrigation system is moved around the field;

a rover navigation box positioned on said steerable drive unit;

said rover navigation box including a GNSS receiver mounted on a printed circuit board;

a rover GNSS antenna mounted on said steerable drive unit which is in communication with said GNSS receiver in said rover navigation box;

said navigation latitude and longitudinal path waypoints being programmed in said rover navigation box;

said rover navigation box operatively connected to said steering actuator to control the operation of said steering actuator;

a base navigation box positioned on said center pivot irrigation system at said center pivot structure;

said base navigation box including a GNSS receiver mounted on a printed circuit board;

a base GNSS antenna mounted on said center pivot irrigation system at said center pivot structure which is in communication with said GNSS receiver in said base navigation box;

said base navigation box configured to compute its latitude and longitudinal position utilizing RTK to send corrections to said rover navigation box whereby said rover navigation box continuously computes its corrected latitude and longitudinal position as said steerable drive unit moves around the field whereby the corrected latitude and longitudinal position of said steerable drive unit is compared to the two closest navigation latitude and longitudinal path waypoints to determine the steering direction of the steering actuator and the amount of steering time to ensure that the steerable drive unit stays on its intended path.

\* \* \* \* \*